United States Patent
Kimata (10) Patent No.: US 7,373,134 B2
(45) Date of Patent: May 13, 2008

(54) MULTIPLE-CPU PORTABLE TERMINAL WITH COMMUNICATION FUNCTION AND CONTROL METHOD

(75) Inventor: Yusuke Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 420 days.

(21) Appl. No.: 10/979,251

(22) Filed: Nov. 3, 2004

(65) Prior Publication Data
US 2005/0101283 A1 May 12, 2005

(30) Foreign Application Priority Data
Nov. 10, 2003 (JP) ............................ 2003-379379

(51) Int. Cl.
*H04B 1/16* (2006.01)
(52) U.S. Cl. ............... 455/343.1; 455/574; 370/311
(58) Field of Classification Search ............ 455/343.1, 455/343.2, 343.4, 574, 127.1, 127.5, 344, 455/232.1, 556.1, 556.2, 557; 370/311
See application file for complete search history.

(56) References Cited

U.S. PATENT DOCUMENTS

| | | | | |
|---|---|---|---|---|
| 5,398,238 A | * | 3/1995 | Inagawa et al. | ............ 370/294 |
| 5,487,181 A | * | 1/1996 | Dailey et al. | ............... 455/90.2 |
| 5,881,055 A | * | 3/1999 | Kondo | ........................ 370/311 |
| 6,014,705 A | * | 1/2000 | Koenck et al. | ............. 709/230 |
| 6,205,333 B1 | * | 3/2001 | Abe | ........................ 455/432.1 |
| 6,571,111 B1 | * | 5/2003 | Mayo et al. | ................. 455/574 |
| 6,968,219 B2 | * | 11/2005 | Pattabiraman et al. | ....... 455/574 |
| 2003/0045333 A1 | * | 3/2003 | Kimata et al. | .............. 455/574 |
| 2003/0054853 A1 | * | 3/2003 | Kouchiyama et al. | ....... 455/522 |
| 2003/0064703 A1 | * | 4/2003 | Toshida | ....................... 455/403 |

FOREIGN PATENT DOCUMENTS

| EP | 1168634 A1 | 1/2002 |
|---|---|---|
| JP | H11-85337 A | 3/1999 |

\* cited by examiner

*Primary Examiner*—Quochien B. Vuong
(74) *Attorney, Agent, or Firm*—Sughrue Mion, PLLC (57) ABSTRACT

In response to the occurrence of an application event in a portable terminal with the communication function that has an application control CPU (ACPU) and a communication control CPU (CCPU), the operation of a control target unit, which is under control of a CCPU and which operates at an intermittent reception time, is detected. During the operation period of the control target unit, an ACPU sends a transmission request to the CCPU to start the CCPU. When the CCPU is in the sleep state in the intermittent reception cycle, the CCPU is not started by the ACPU.

15 Claims, 12 Drawing Sheets

| PRIORITY | CONTENTS |
|---|---|
| 1 | DOES NOT SENSE OPERATION MONITOR TERMINAL LEVEL BUT ISSUES TRANSMISSION REQUEST INTERRUPT WHEN EVENT OCCURS |
| 2 | SENSES OPERATION MONITOR TERMINAL LEVEL AND, IMMEDIATELY AFTER CONFIRMING THAT THE LEVEL IS ON, ISSUES TRANSMISSION REQUEST INTERRUPT |
| 3 | SENSES OPERATION MONITOR TERMINAL LEVEL AND, AFTER CONFIRMING THAT THE LEVEL IS ON, WAITS FOR ONE INTERMITTENT RECEPTION CYCLE AND THEN ISSUES TRANSMISSION REQUEST INTERRUPT |

MULTIPLE-CPU PORTABLE TERMINAL WITH COMMUNICATION FUNCTION AND CONTROL METHOD

FIELD OF THE INVENTION

The present invention relates to a portable terminal, and more particularly to a multiple-CPU portable terminal with the communication function and its control method.

BACKGROUND OF THE INVENTION

There are two types of portable terminals with the communication function: one is a portable terminal that uses a single CPU, and the other is a portable terminal that uses multiple CPUs, for managing and controlling the communication function and the other service functions (for example, see Patent Document 1).

As the service function of a portable terminal is extended and sophisticated, more and more portable terminals will use multiple CPUs.

One CPU is a communication control CPU (CCPU) that controls and manages the RF (radio frequency) unit and the signal processing DSP (digital signal processor) required primarily for the actual communication. The other CPU is an application control CPU (ACPU) that controls and manages the user interface for the liquid crystal display unit, the audio input/output unit, the key unit, and the optical unit of the portable terminal.

Today, more and more portable terminals use multiple CPUs. This is because a single-CPU portable terminal, if used for managing and controlling both the communication function that does not functionally change so much and the application function such as the digital camera function or the game function that is extended and added, requires a long time and a high cost for developing the CPU and its control software. The single-CPU configuration also involves a high possibility of design errors and therefore causes the increases of the development risk.

In the multiple-CPU configuration, the ACPU and the CCPU are controlled as follows. When data processing is not performed, the ACPU is usually placed in the sleep state to consume less power; when data communication is not performed, the CCPU is usually placed in the sleep state to consume less power except when it monitors a communication start request sent from an external unit. For example, when communication is requested through the user key operation that is the user interface, the ACPU starts the CCPU to allow the CCPU to carry out communication.

However, in the intermittent reception operation mode in which the communication is turned on and off at a regular interval to monitor the call acceptance state, the CCPU enters the active state and sleep state in synchronization with the time at which the intermittent reception operation is executed. However, the ACPU cannot sense this time. If the ACPU sends a transmission request to the CCPU randomly, the CCPU in the sleep state is forced to start and, as a result, the consumption current flows. This consumption current shortens the operation time, the call time, and the wait time of the portable terminal driven by a battery. Therefore, there is a need for a CPU operation method for minimizing the waste.

[Patent Document 1] Japanese Patent Kokai Publication No. JP-A-11-85337

SUMMARY OF THE DISCLOSURE

In view of the foregoing, it is an object of the present invention to provide a portable terminal with multiple-CPU configuration as well as its control method that allow the ACPU to start the CCPU at a right time to reduce the power consumption.

The above and other objects are attained by a portable terminal in accordance with one aspect of the present invention, which includes a first CPU for primarily managing and controlling a communication function and a second CPU for primarily managing and controlling an application, comprises means for detecting a reception period operation in an intermittent reception mode of the portable terminal; and means for causing the second CPU to start the first CPU in response to a detection of the reception period operation.

The reception period operation should be detected in response to the occurrence of an application event in the portable terminal. It is also possible that the second CPU starts the first CPU in the next reception period in the intermittent reception period.

A portable terminal, in accordance with another aspect of the present invention, including a first CPU for primarily managing and controlling a communication function and a second CPU for primarily managing and controlling an application, comprises means for detecting an occurrence of an application event in the portable terminal; means for detecting an operation of a control target unit that is under control of the first CPU and that operates in an intermittent reception mode; and means for causing the second CPU to start the first CPU in the next reception period of the operation period of the control target unit.

In the present invention, the second CPU may start the first CPU in the next operation period of the control target unit. In addition, the control target unit may be a low-noise amplifier provided in an RF unit in the portable terminal. The portable terminal further comprises means for sending necessary information from the second CPU to the first CPU after the first CPU is started.

A portable terminal in accordance with another aspect of the present invention, including a first CPU for primarily managing and controlling a communication function and a second CPU for primarily managing and controlling an application, comprises means for causing the second CPU to start the first CPU in response to an occurrence of a first-priority event of an application in the portable terminal during an operation in an intermittent reception mode; means for detecting a reception period operation in the intermittent reception mode in response to an occurrence of a second-priority event, the second-priority event being an event of an application in the portable terminal, the second-priority event being lower than the first-priority event in priority; means for causing the second CPU to start the first CPU in the reception period; means for detecting a reception period operation in an intermittent reception cycle in response to an occurrence of a third-priority event, the third-priority event being an event of an application in the portable terminal, the third-priority event being lower than the second-priority event in priority; and means for causing the second CPU to start the first CPU in the next reception period in the intermittent reception cycle.

A portable terminal in accordance with a further aspect of the present invention, including a first CPU for primarily managing and controlling a communication function and a second CPU for primarily managing and controlling an application, comprises first CPU core means for performing the function of the first CPU, the first CPU core means being in a sleep state when a communication is off in an intermittent reception mode; first control interface means for starting the first CPU core means, the first control interface means being in an operation state in the intermittent reception mode; second CPU core means for performing the function of the second CPU, the second CPU core means being in a sleep state when a communication is off in the intermittent reception mode; second control interface means for starting the second CPU core means, the second control interface means being in an operation state in the intermittent reception mode; means for detecting a reception period in response to an occurrence of an application event in the portable terminal during an operation in the intermittent reception mode; and means for sending a transmission request from the second control interface, means to the first control interface means in the reception period, wherein, in response to the transmission request, the first control interface means starts the first CPU core means and the second CPU core means supplies necessary information to the first CPU core means.

A transmission request may also be sent from the second control interface means to the first control interface means in the next reception period in the intermittent reception cycle after the reception period operation is detected in the intermittent reception cycle in response to the occurrence of an application event in the portable terminal during the operation in the intermittent reception mode.

A control method in accordance with an aspect of the present invention, which is for use in a portable terminal including a first CPU for primarily managing and controlling a communication function and a second CPU for primarily managing and controlling an application, comprises the steps of detecting a reception period operation in an intermittent reception mode of the portable terminal; and causing the second CPU to start the first CPU. In addition, the present invention provides a control method for use in a portable terminal including a first CPU for primarily managing and controlling a communication function and a second CPU for primarily managing and controlling an application, the control method comprising the steps of detecting an occurrence of an application event in the portable terminal; detecting an operation of a control target unit that is under control of the first CPU and that operates in an intermittent reception mode; and causing the second CPU to start the first CPU in the operation period of the control target unit.

A control method in accordance with an aspect of the present invention, which is for use in a portable terminal including a first CPU for primarily managing and controlling a communication function and a second CPU for primarily managing and controlling an application, comprises a first control step comprising the step of causing the second CPU to start the first CPU during an operation in an intermittent reception mode in response to an occurrence of an application event in the portable terminal; a second control step comprising the steps of detecting a reception period during an operation in an intermittent reception mode in response to an occurrence of an application event in the portable terminal; and causing the second CPU to start the first CPU in the reception period; and a third control step comprising the steps of detecting a reception period of an intermittent reception cycle during an operation in an intermittent reception mode in response to an occurrence of an application event in the portable terminal; waiting until the next reception period in the intermittent reception cycle; and causing the second CPU to start the first CPU in the next reception period, the control method further comprising the step of making the first control step correspond to a first-priority event, the second control step correspond to a second-priority event that is lower than the first-priority event in priority, and the third control step correspond to a third-priority event that is lower than the second-priority event in priority.

The meritorious effects of the present invention are summarized as follows.

The portable terminal and the control method according to present invention, which detect a reception period operation in an intermittent reception cycle to allow the second CPU to send a transmission request to the first CPU in the reception period, require less power as compared when the transmission request is issued randomly.

According to the present invention, the mode in which the first CPU is started is selected according to the priority of an event that occurs to coordinate the control delay and the priority.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Embodiments of the present invention will now be described with reference to the drawings.

First Embodiment

Figure 1:
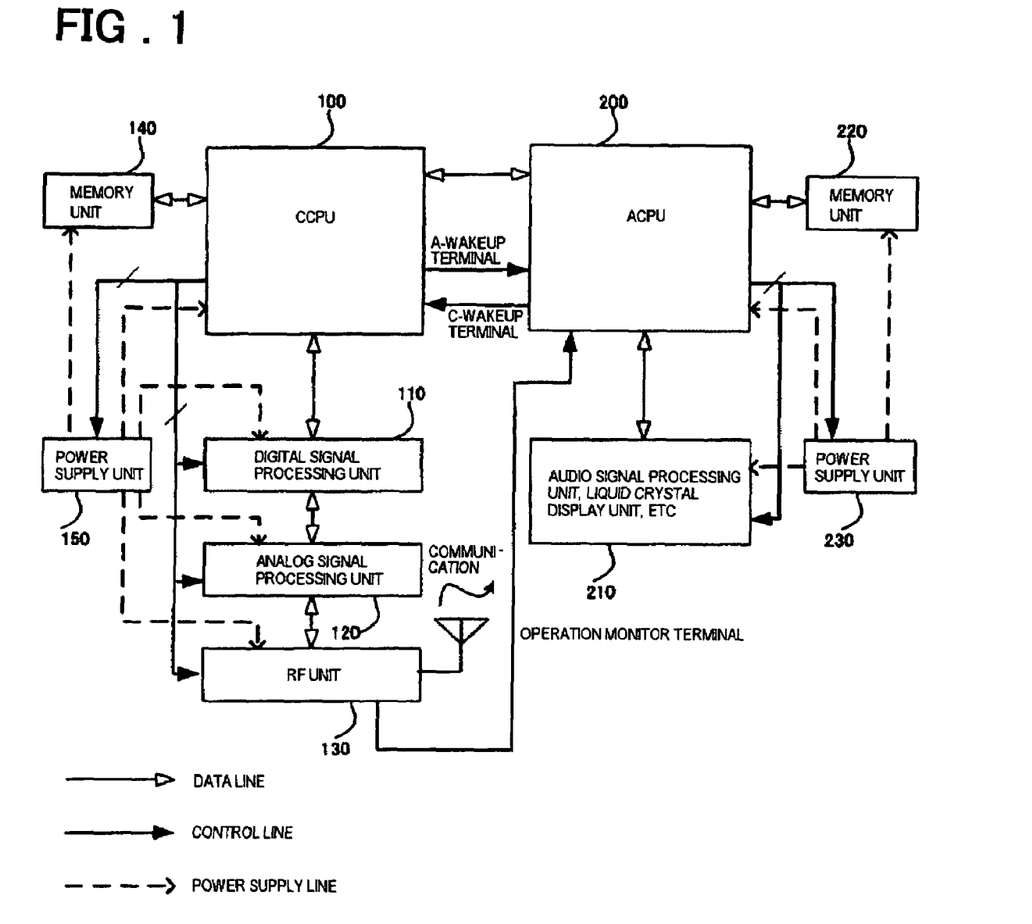
FIG. 1 is a block diagram of a portable terminal with the communication function in one embodiment of the present invention.

FIG. 1 is a block diagram of a portable terminal according to the present invention. This figure primarily shows the part related to the present invention. Referring to FIG. 1, the portable terminal according to the present invention has two CPUs: one is a communication control CPU (CCPU) 100 that primarily controls and manages the communication function and the other is an application control CPU (ACPU) 200 that controls and manages the application function for the user interface units such as a liquid crystal display unit and an audio input/output unit.

The CCPU 100 mainly controls a digital signal processing unit 110, an analog signal processing unit 120, an RF (radio frequency) unit 130, a memory unit 140, and a power supply unit 150 according to the control program.

The RF unit 130 modulates/demodulates and sends/receives a signal. The analog signal processing unit 120 receives a demodulated signal from the RF unit 130 and performs analog to digital conversion of the received signal to supply the converted signal to the digital signal processing unit 110. The analog signal processing unit 120 also receives a signal from the digital signal processing unit 110 and performs digital to analog conversion of the received signal to send the converted signal to the RF unit 130.

The digital signal processing unit 110 processes a digital signal. That is, the digital signal processing unit 110 receives a signal from the analog signal processing unit 120 and decodes the received signal to supply the decoded signal to the CCPU 100. The digital signal processing unit 110 receives a signal from the CCPU and encodes the received signal to supply the encoded signal to the analog signal processing unit 120.

Control information and the like are stored in the memory unit 140. The CCPU 100 reads information from, and writes information to, the memory unit 140 according to the control information as necessary. The power supply unit 150 supplies power to the CCPU 100, the digital signal processing unit 110, the analog signal processing unit 120, the RF unit 130, and the memory unit 140 under control of the CCPU 100.

The ACPU 200 mainly controls devices 210 such as an audio signal processing unit and a liquid crystal display unit that function as a user interface. A memory unit 220 contains control information and the like. The ACPU 200 reads information from, and writes information into, the memory unit 220 as necessary.

A power supply unit 230 supplies power to the ACPU 200, the devices 210 such as the audio signal processing unit and the liquid crystal display unit, and the memory unit 220 under control of the ACPU 200.

Figure 2:
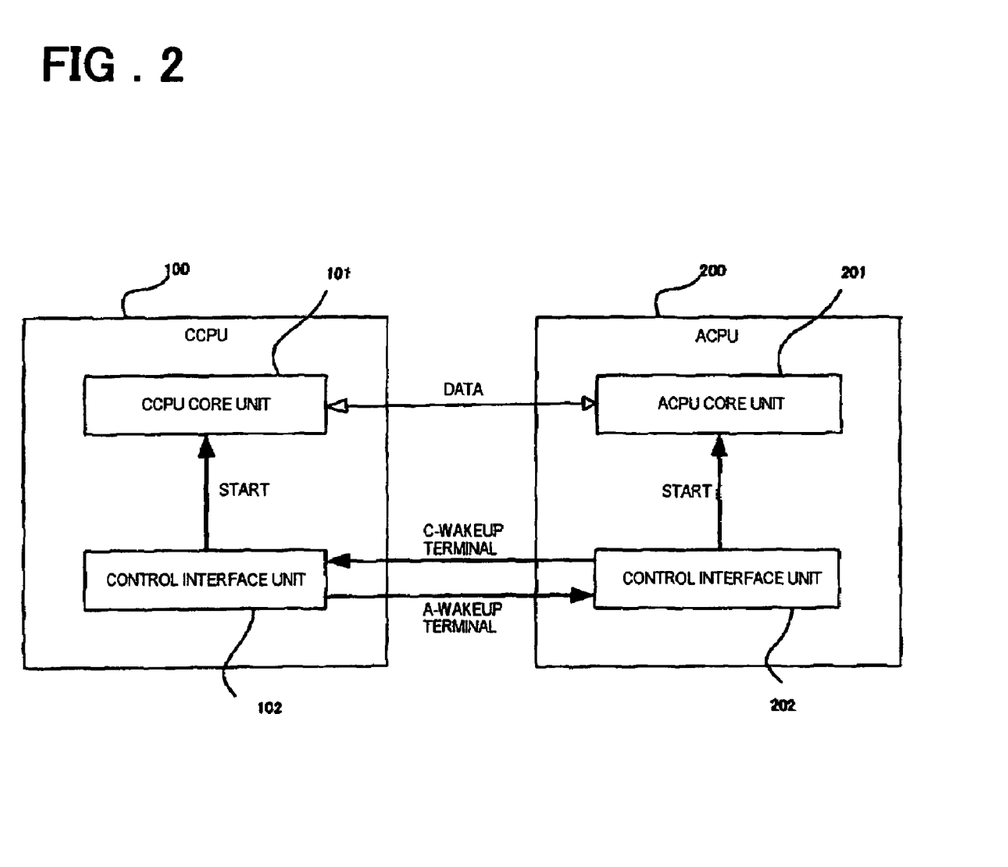
FIG. 2 is a block diagram of a CCPU and an ACPU used in the embodiment of the present invention.

FIG. 2 is a block diagram showing the CCPU and the ACPU. Referring to FIG. 2, the CCPU 100 has a CCPU core unit 101 and a control interface unit 102 and the ACPU 200 has an ACPU core unit 201 and a control interface unit 202, respectively.

The CCPU core unit 101 and the ACPU core unit 201 transfer data each other, analyze and calculate/process signals, and control other units. When the communication is off during the intermittent reception operation, a clock signal is not supplied to the core units and the CCPU and the ACPU enter the sleep state.

The control interface unit 102 monitors the interrupt signal from the ACPU and the CCPU. For example, when a high-level signal is sent from the ACPU to the CCPU as the transmission request interrupt signal via the C-wakeup terminal, the control interface unit 102 senses the signal, switches the CCPU core unit 101 from the sleep state to the active state and then a high-level signal is sent from the CCPU to the ACPU as the response interrupt signal via the A-wakeup terminal.

Conversely, the control interface unit 202 monitors the interrupt signal from the CCPU and the ACPU. For example, when a high-level signal is sent from the CCPU to the ACPU as the transmission request interrupt signal via the A-wakeup terminal, the control interface unit 202 senses the signal, switches the ACPU core unit 201 from the sleep state to the active state and then a high-level signal is from the ACPU to the CCPU as the response interrupt signal via the C-wakeup terminal.

Those control interface units 102 and 202 are always on in the intermittent reception mode both when the communication is on and when the communication is off.

Figure 3:
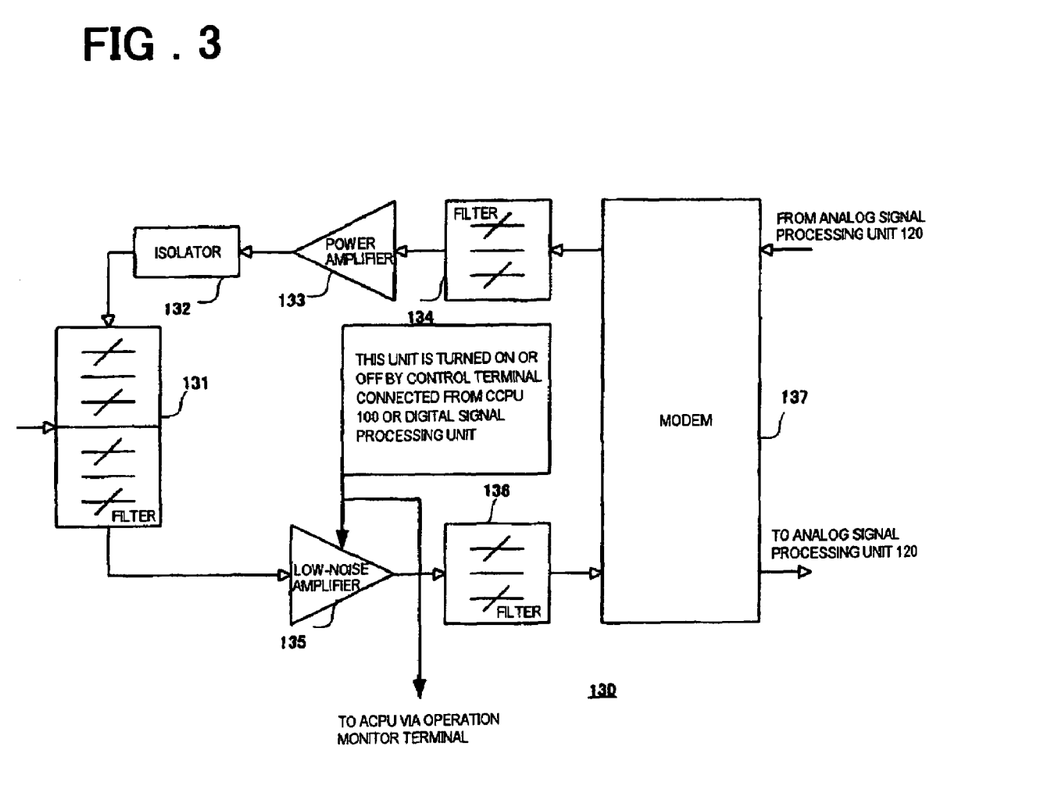
FIG. 3 is a block diagram of an RF unit used in the embodiment of the present invention.

FIG. 3 is a block diagram showing the configuration of the RF unit 130. Referring to FIG. 3, the RF unit 130 comprises a filter 131 that passes only the transmission signal and the reception signal; an isolator 132 that prevents a high-power signal from flowing into the opposite direction of the signal; a power amplifier 133 that amplifies the transmission signal; a filter 134 that passes only the transmission signal; a low-noise amplifier 135 that amplifies the reception signal; a filter 136 that passes only the reception signal; and a modem 137 that modulates the transmission signal received from the analog signal processing unit 120 and demodulates the reception signal.

The low-noise amplifier 135 is turned on or off by the control signal supplied from the CCPU 100 or the digital signal processing unit 110 usually at the same time the intermittent reception operation is performed in the intermittent reception mode. Therefore, in this embodiment, the control signal supplied to the low-noise amplifier 135 is supplied to the ACPU unit via the operation monitor terminal so that the ACPU can monitor the level of the control signal at the terminal. This operation monitor terminal is not always required to connect to the control signal of the low-noise amplifier 135 but is only required to connect to a unit that operates at the same time the intermittent reception operation is performed.

Next, the operation of the present embodiment will be described in detail with reference to the control flowchart in FIG. 4 and the timing diagram in FIG. 5.

In the description of the control method described below, it is assumed that the CCPU 100 is operating in the intermittent reception mode. That is, the communication is turned on in synchronization with the communication start timing of the reception period in the intermittent reception cycle and is turned off in synchronization with the communication termination timing of the reception period. After the intermittent period, the reception period is started again. This operation is repeated cyclically (see FIG. 5).

Figure 4:
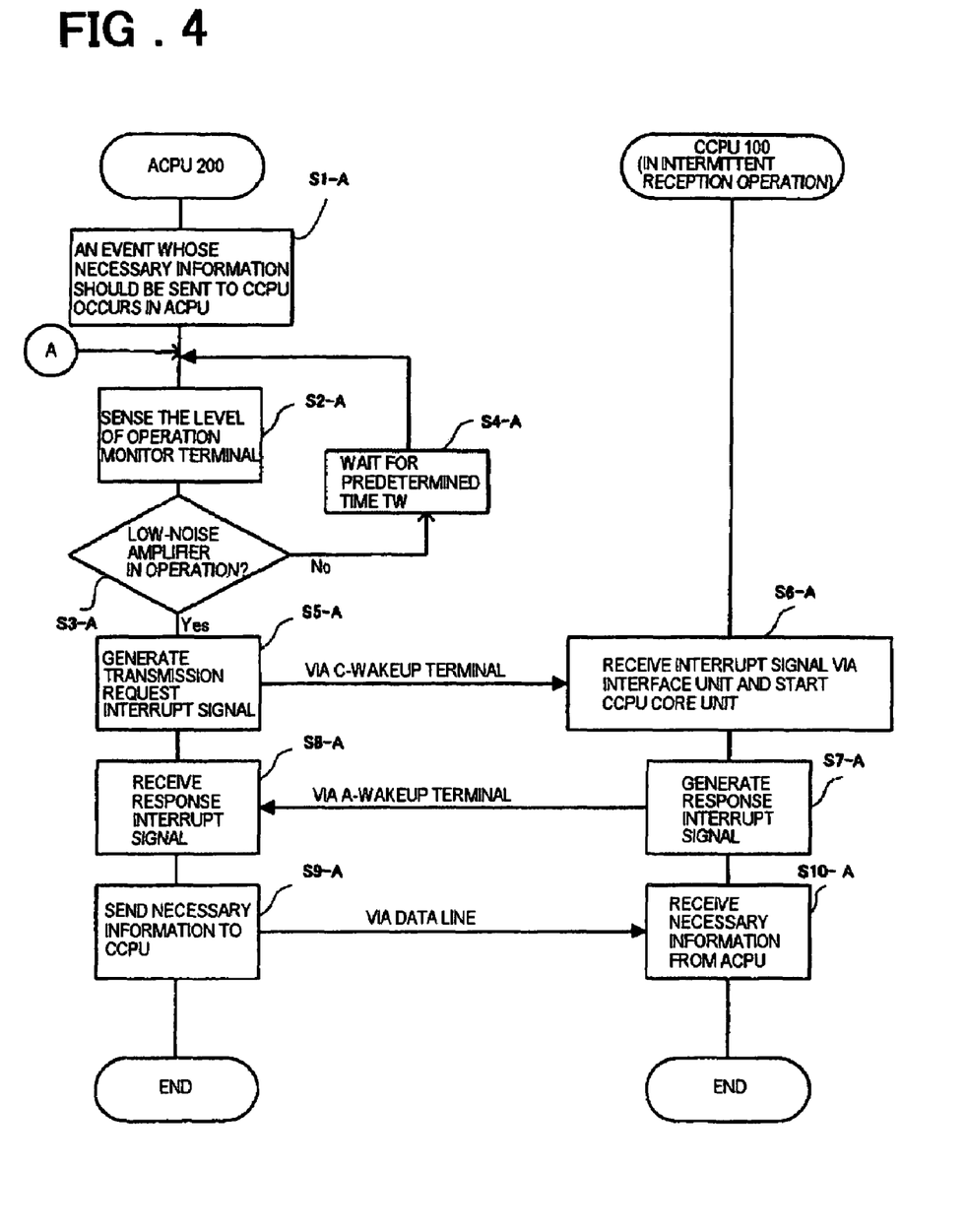
FIG. 4 is a control flowchart showing a first embodiment of the present invention.
Figure 5:
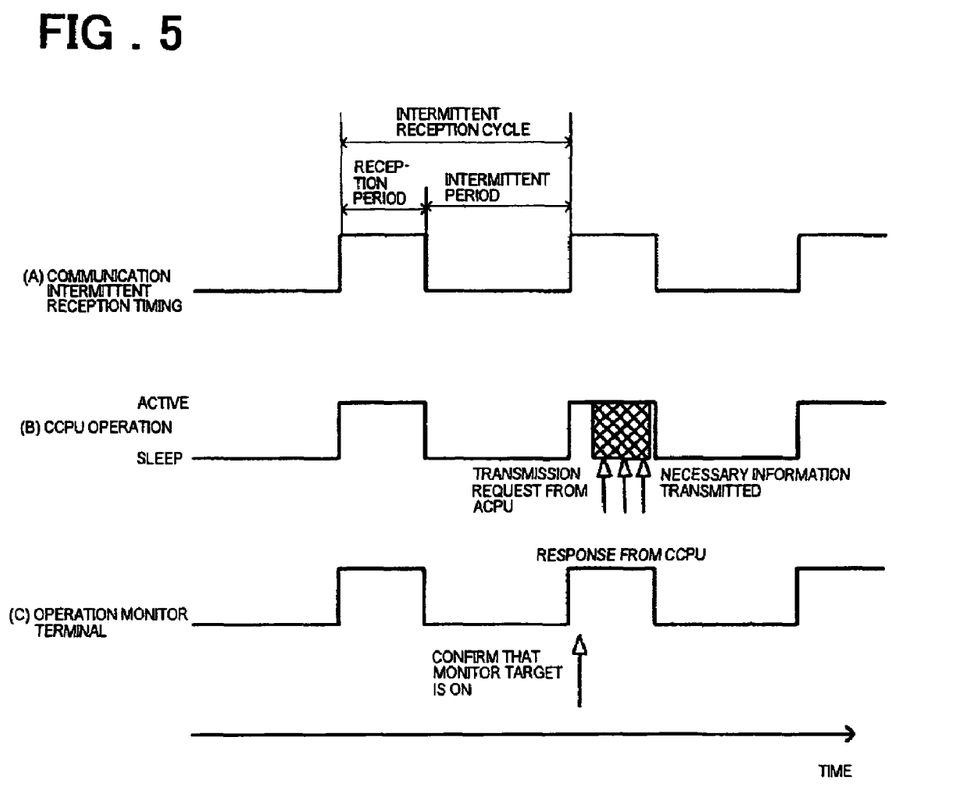
FIG. 5 is a diagram showing the timing waveform of the first embodiment.

Referring to FIG. 4, an event whose necessary information should be sent to the CCPU 100 occurs in the ACPU 200 (step 1-A). An event whose information should be sent to the CCPU 100 occurs in many situations. For example, an event occurs when the battery voltage of the power supply monitored by the ACPU 200 falls below a predetermined threshold value or when a user issues a call request via the user interface managed by the ACPU 200.

Next, the ACPU 200 senses the level (high or low) of the operation monitor terminal (step 2-A) and determines if the monitor target is on (step 3-A). In this embodiment, the ACPU 200 checks if the control terminal of the low-noise amplifier 135 is on or off. If the control terminal is on (step 3-A: Yes), control is passed to step 5-A. If the control terminal is off (step 3-A: No), the ACPU 200 waits for a predetermined time Tw (step 4-A) and control is returned to step 2-A. The wait time Tw is set to a length of time equal to or shorter than the reception period of the intermittent operation time. The on state of the monitor target can be sensed in the loop of steps 2-A, 3-A, and 4-A.

If the monitor target is in operation (step 3-A: Yes), the ACPU 200 generates a transmission request interrupt signal and supplies it to the CCPU 100 via the C-wakeup terminal (step 5-A). The control interface unit 102 senses the interrupt signal and starts the CCPU core unit 101 (step 6-A). Next, the CCPU 100 generates the response interrupt signal (step 7-A) and sends it to the ACPU 200 via the A-wakeup terminal.

In response (step 8-A), the ACPU 200 sends necessary information to the CCPU 100 (step 9-A). In this case, the necessary information includes information necessary to synchronize the data transmission time.

In the present embodiment of this present invention, the ACPU detects that the CCPU is in the reception operation period in the intermittent reception cycle and, after that, the ACPU issues a transmission request to the CCPU. This method prevents a transmission request from being issued during the intermittent period in the intermittent reception cycle, thus reducing the consumption current. Whether or not the CCPU is in the reception operation period in the intermittent reception cycle can be detected easily because a check is made for the monitor target that operates under control of the CCPU and that works with the CCPU in the intermittent reception cycle.

Second Embodiment

Figure 6:
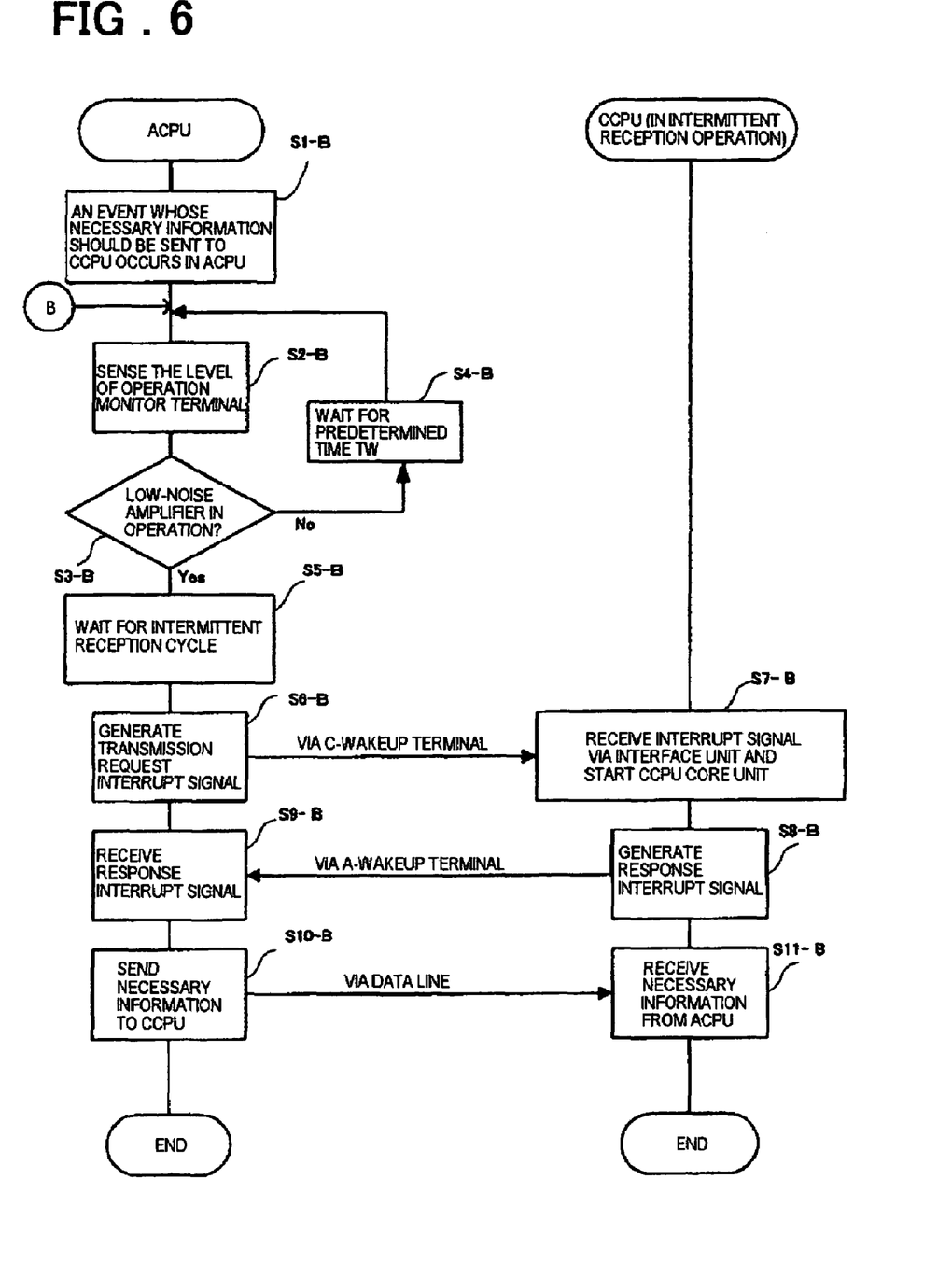
FIG. 6 is a control flowchart showing a second embodiment of the present invention.

A second embodiment of the present invention will be described in detail with reference to the control flowchart in FIG. 6 and the timing diagram in FIG. 7.

In the second embodiment of the present invention, an ACPU 200 senses the level of the operation monitor terminal, confirms that the monitor target (for example, the control terminal of a low-noise amplifier 135) is on, generates the transmission request interrupt signal after waiting for the period of the intermittent reception cycle (consisting of the reception period and the intermittent period), and supplies this signal to a CCPU 100 via the C-wakeup terminal.

In the description of the control method described below, it is assumed that the CCPU 100 is operating in the intermittent reception mode. That is, the CCPU 100 cyclically repeats the operation in which the CCPU 100 turns on the communication in synchronization with the communication start timing of the reception period in the intermittent reception cycle, turns off the communication in synchronization with the communication termination timing of the reception period and, after the intermittent period, starts the communication period again.

An event, whose necessary information should be sent to the CCPU, occurs in the ACPU 200 (step 1-B). There are many situations in which an event has information to be sent to the CCPU 100. For example, an event occurs when the battery voltage of the power supply monitored by the ACPU 200 falls below a predetermined threshold value or when the user issues a call request via the user interface managed by the ACPU 200.

The ACPU 200 senses the level of the operation monitor terminal (step 2-B) to check if the monitor target is on (step 3-B). In this embodiment, the ACPU 200 checks if the control terminal of the low-noise amplifier 135 is on or off. If the control terminal is on (step 3-B: Yes), control is passed to step 5-B. If the control terminal is off (step 3-B: No), the ACPU 200 waits for a predetermined time Tw (step 4-B). The ACPU 200 can detect that the monitor target is on if the wait time Tw is set to a length of time equal to or shorter than the reception period of the intermittent operation time.

After that, the ACPU 200 senses the level of the operation monitor terminal again (step 2-B) and confirms that the monitor target is on (step 3-B: Yes).

Next, the ACPU 200 waits for the time Ts of the intermittent reception period (step 5-B) and generates the transmission request interrupt signal (step 6-B). The ACPU 200 supplies the generated signal to the CCPU 100 via the C-wakeup terminal.

The control interface unit 102 senses the interrupt signal and starts the CCPU core unit 101 (step 7-B). Next, the CCPU 100 generates the response interrupt signal (step 8-B) and supplies this signal to the ACPU 200 via the A-wakeup terminal. The ACPU 200 receives the response interrupt signal (step 9-B) and sends necessary information to the CCPU 100 (step 10-B). In this case, all information such as information necessary to synchronize the data transmission time is exchanged.

Figure 7:
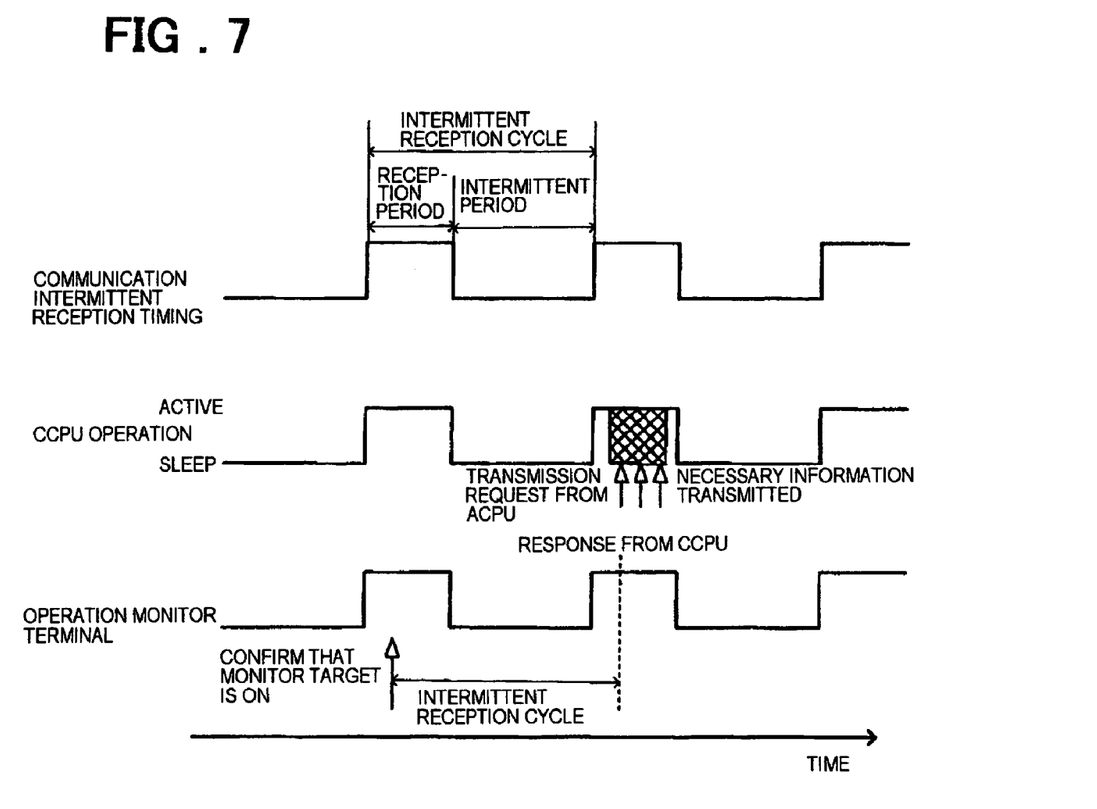
FIG. 7 is a diagram showing the timing waveform of the second embodiment.

FIG. 7 shows an example of timing waveforms. In this example, an event occurs and that the monitor target is on is confirmed in the reception period. After that, the ACPU issues a transmission request in the next reception period after the intermittent reception cycle and, during that period, the transmission of the CCPU response and the necessary information is completed.

In the present embodiment, the generation of the transmission request interrupt signal is delayed for one intermittent reception cycle from the moment the high level of the operation monitor terminal is detected; that is, the transmission request interrupt signal is generated in the next reception period. In the present embodiment, although there is a control delay as compared with the first embodiment, the procedure for confirming that the monitor target is on can be omitted in the reception period in which the transmission request is issued. This means that the ACPU can issue the transmission request immediately, as a result of which, even when the time required for transmitting necessary information exceeds the reception time in the intermittent reception cycle, the excess time is small in its extent. Accordingly, this method shortens the period in which an extra current flows, thereby reducing the power consumption.

Figure 8:
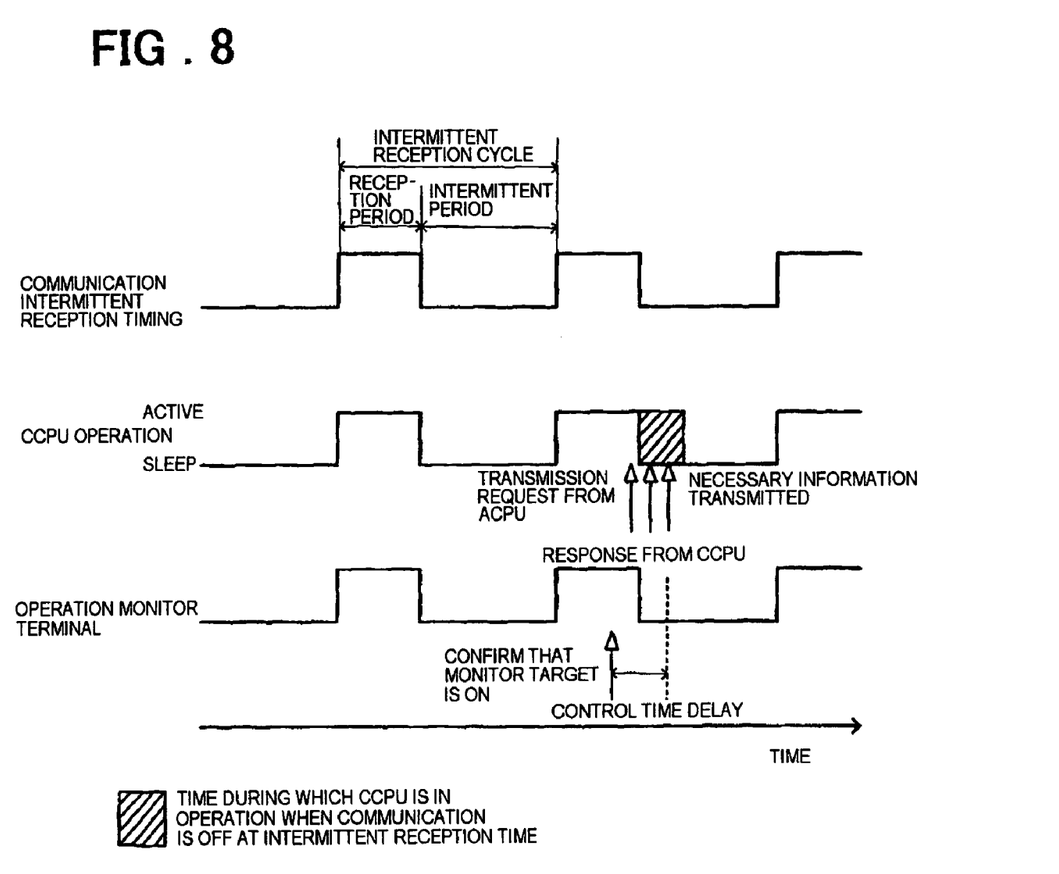
FIG. 8 is a diagram showing the timing waveform of the first embodiment where it is detected near the end of the reception period of an intermittent reception cycle that the monitor target is in operation.

FIG. 8 shows that, in the first embodiment, the time at which the monitor target is turned on after the occurrence of an event is near the end of the reception period. In this case, although the ACPU can generate the transmission request in that reception period, the necessary information is transmitted in the intermittent period. This requires that the CCPU be kept active with the result that the consumption current flows in that period. By contrast, according to the second embodiment, once the ACPU detects that the monitor target is on in a reception period, the ACPU can immediately issue the transmission request after the length of time equal to one intermittent reception cycle elapses from that time and thus the operation in the intermittent period can be reduced. Therefore, this method reduces the power consumption in the intermittent period because the operation in the intermittent period is reduced.

Third Embodiment

In a third embodiment, a portable terminal and its control method are provided in which the portable terminal is controlled according to a priority assigned to the necessary information sent from an ACPU 200 to a CCPU 100 to maintain the balance between the power saving by the intermittent reception technology and the event priority.

Figure 9:
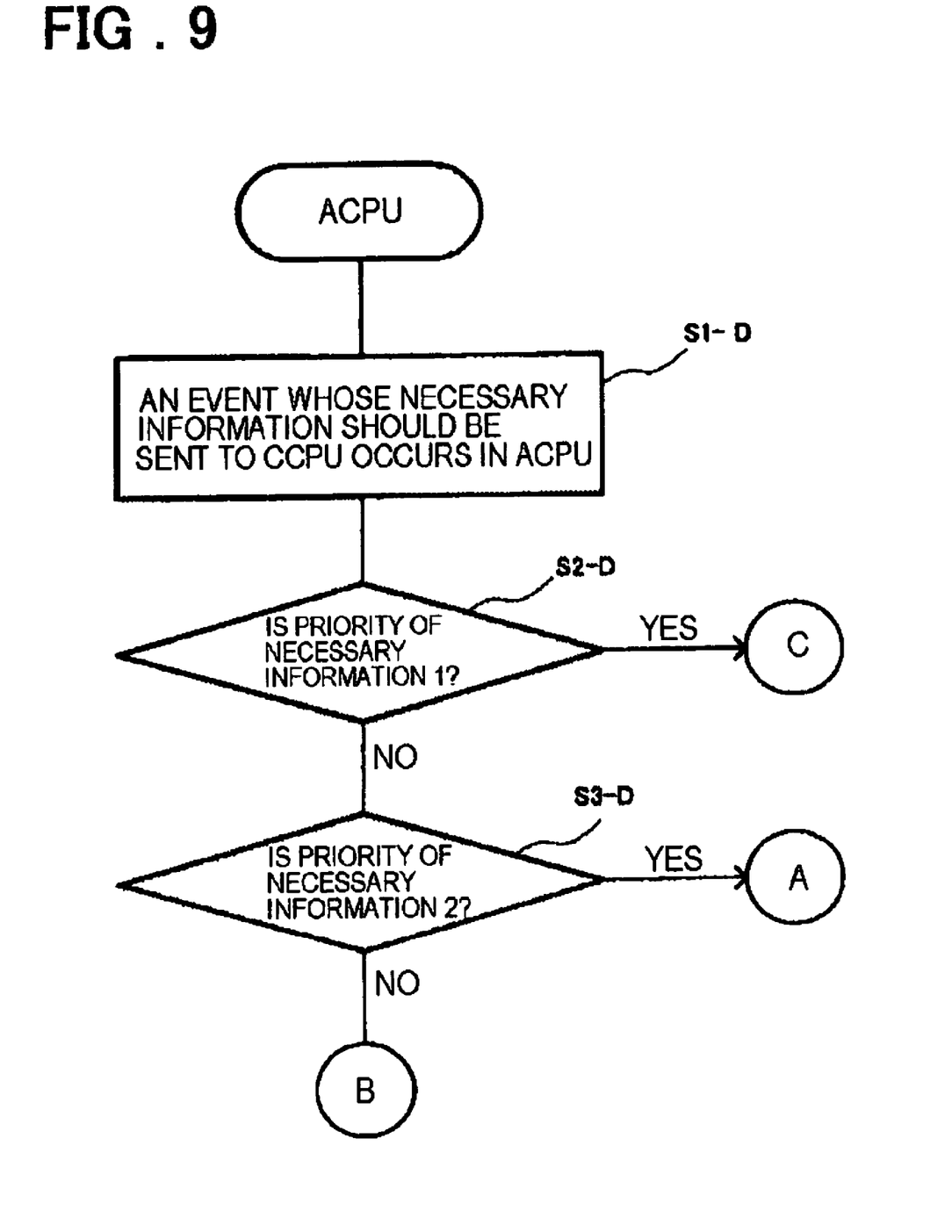
FIG. 9 is a flowchart showing a third embodiment that determines the priority of necessary information.

The third embodiment of the present invention will be described in detail with reference to FIGS. 9, 10 and 11. FIG. 9 is a flowchart showing how to determine the priority table of necessary information, FIG. 10 is a diagram showing the overview of the priorities and their control, and FIG. 11 is a control flowchart showing how necessary information is sent when the priority is highest.

Referring to FIG. 9, when an event whose necessary information should be sent to the CCPU 100 occurs in the ACPU 200 (step 1-D), the priority of the necessary information is checked. Whether the priority of the necessary information is 1 is checked (step 2-D) and, if the priority is 1, the control method is set to mode C and control is passed to a connector C (The corresponding connector is connector C in FIG. 11). If the priority is not 1, whether the priority of the necessary information is 2 is checked (step 3-D) and if the priority is 2, the control method is set to mode A and control is passed to a connector A (The corresponding connector is A in FIG. 4). If the priority is not 2, the control method is set to mode B and control is passed to a connector B (The corresponding connector is B in FIG. 6).

Figure 10:
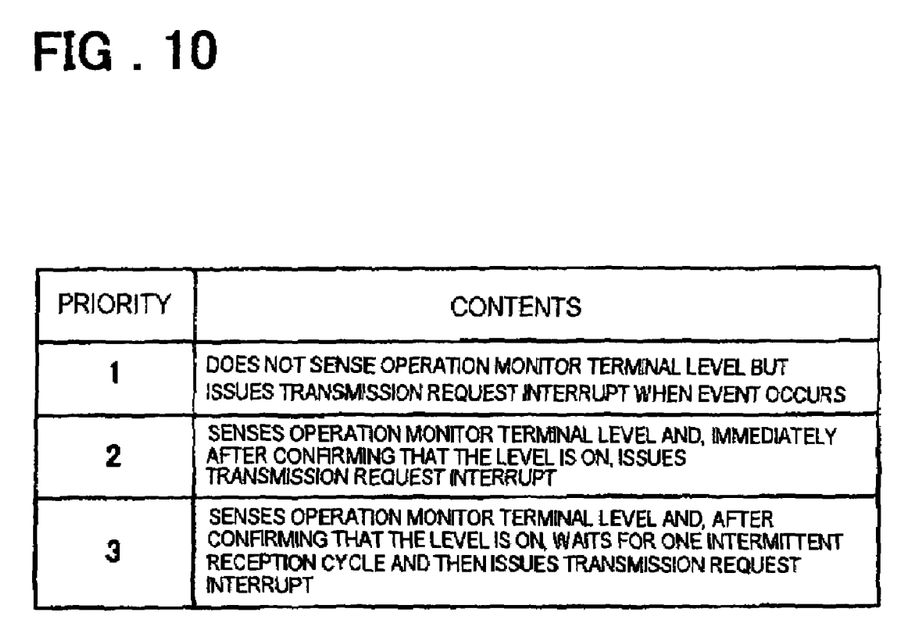
FIG. 10 is a diagram showing the overview of the priority and its control in the third embodiment.
Figure 11:
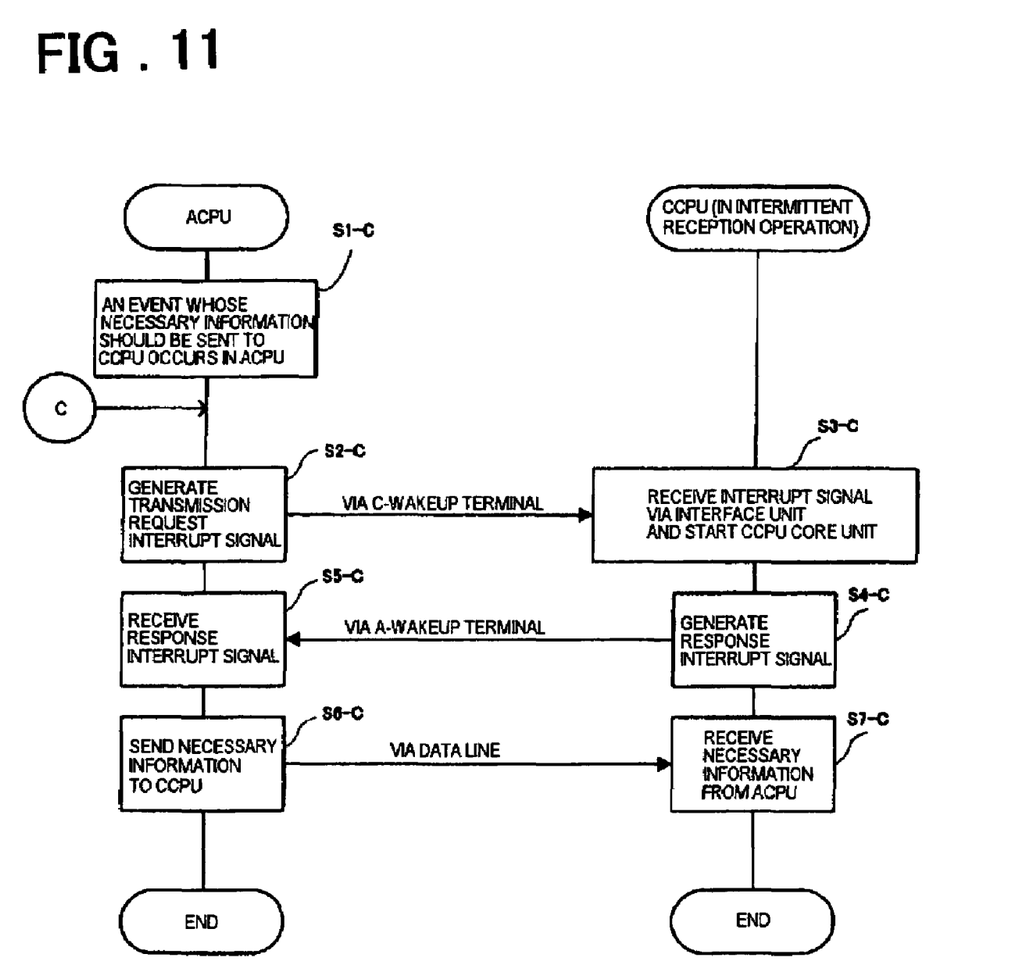
FIG. 11 is a control flowchart of priority 1 in the third embodiment.

Referring to FIG. 10, if the priority is 1, the ACPU 200 does not sense the level of the operation monitor terminal but generates the transmission request interrupt when an event occurs. If the priority is 2, the ACPU 200 senses the level of the operation monitor terminal and, after confirming that the operation monitor terminal is on, immediately generates the transmission request interrupt and sends it. If the priority is 3, the ACPU 200 senses the level of the operation monitor terminal and, after confirming that the operation monitor terminal is on, generates the transmission request interrupt and sends it after the time equal to the intermittent reception cycle elapses.

An example of priority 1 is the issuance of a call request from the user interface (for example, a telephone number is entered and the call button is pressed). An example of priority 2 is the transmission of a battery voltage measurement result from the ACPU to the CCPU.

The control method C used for priority 1 is as shown in FIG. 11. When an event whose necessary information should be sent to the CCPU occurs in the ACPU 200 during the intermittent reception operation of the CCPU 100, the ACPU 200 generates the transmission request interrupt signal (step 2-C) and outputs the generated signal to the CCPU 100 via the C-wakeup terminal. Next, the control interface unit 102 senses the interrupt signal and starts the CCPU core unit 101. If the CCPU core unit 101 is already started, the CCPU core unit 101 retains its state (step 3-C).

Next, the CCPU 100 generates the response interrupt signal (step 4-C) and sends this signal to the ACPU 200 via the A-wakeup terminal. In response (step 5-C), the ACPU 200 sends the necessary information to the CCPU 100 (step 6-C). In this case, the necessary information includes all information such as data transmission time synchronization information.

When an event occurs in a portable terminal controlled according to the flowchart shown in FIG. 11, the transmission request is generated regardless of whether the terminal is in the reception operation state or the sleep state in the intermittent reception mode. Although there is no control delay, the CCPU is activated even for a low-priority event. Therefore, from the viewpoint of power saving, it is not desirable to always use this control method.

Figure 12:
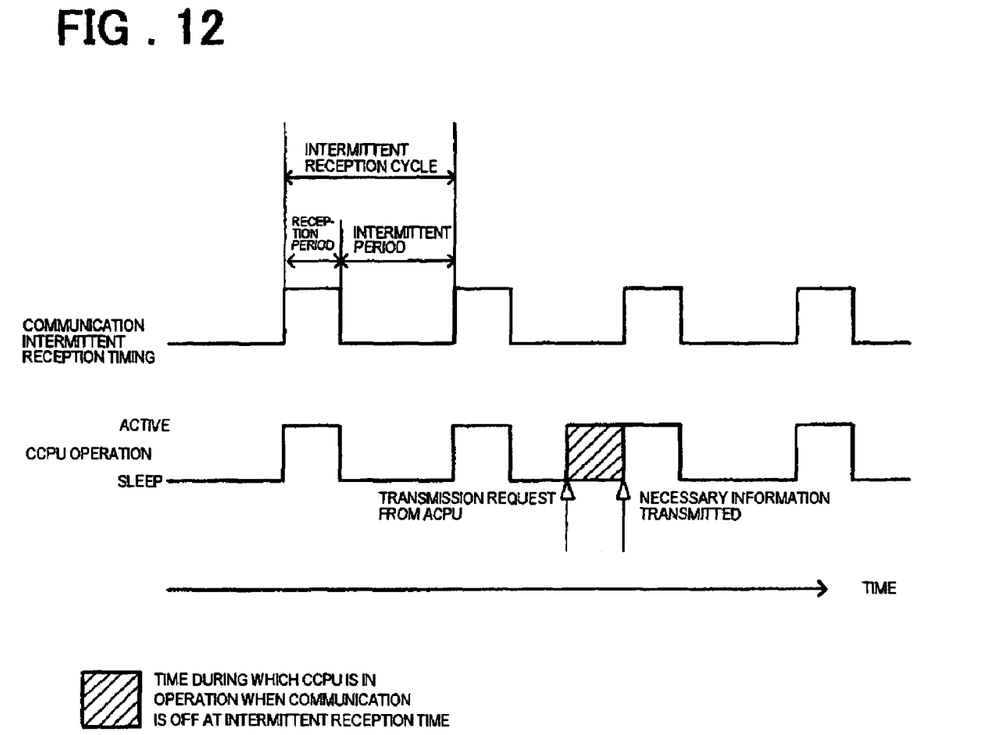
FIG. 12 is a timing diagram of priority 1 in the third embodiment.

FIG. 12 is a timing diagram showing how a transmission request is issued and necessary information is sent in the intermittent period in the intermittent reception mode of the control method C.

The control method A used for priority 2 is the control method mentioned in the first embodiment. That is, the interrupt is generated and sent to the CCPU according to the flow beginning with step 2-A in FIG. 4. This control method detects the reception operation period in the intermittent reception cycle and issues the transmission request to the ACPU upon detection that the operation monitor terminal level is high. Thus, as compared with the control method C, this control method consumes less power.

The control method B used for priority 3 is the control method mentioned in the second embodiment. That is, the interrupt is generated and sent to the CCPU according to the flow beginning with step 2-B in FIG. 6. This control method generates the transmission request interrupt signal after the length of time equal to one intermittent reception cycle from the moment the high level of the operation monitor terminal is detected. Although there is more control delay as compared with the first embodiment, the amount of necessary information signal transmitted in the intermittent period can be reduced.

As described above, priority is assigned to the necessary information in this embodiment and the operation is controlled according to the priority to maintain the balance between power saving and event priority in the intermittent reception technology.

It should be noted that other objects, features and aspects of the present invention will become apparent in the entire disclosure and that modifications from the disclosed embodiments may be done without departing the scope of the present invention claimed as appended herewith.

Also it should be noted that any combination of the disclosed and/or claimed elements, matters and/or items may fall under the modifications aforementioned.

What is claimed is:

1. A portable terminal including a first CPU for primarily managing and controlling a communication function and a second CPU for primarily managing and controlling an application, said portable terminal comprising:
   a unit for detecting an occurrence of an application event in said portable terminal;
   a unit for detecting an operation of a control target unit that is under control of said first CPU and that operates in an intermittent reception mode; and
   a unit for causing said second CPU to start said first CPU in the operation period of said control target unit.

2. The portable terminal according to claim 1, wherein said control target unit is a low-noise amplifier provided in an RF unit of said portable terminal.

3. The portable terminal according to claim 1, further comprising a unit for sending necessary information from said second CPU to said first CPU after said first CPU is started.

4. A portable terminal including a first CPU for primarily managing and controlling a communication function and a second CPU for primarily managing and controlling an application, said portable terminal comprising:
   a unit for detecting an occurrence of an application event in said portable terminal;
   a unit for detecting an operation of a control target unit that is under control of said first CPU and that operates in an intermittent reception mode; and
   a unit for causing said second CPU to stan said first CPU in the next reception period of the operation period of said control target unit.

5. The portable terminal according to claim 4, wherein said control target unit is a low-noise amplifier provided in an RE unit of said portable terminal.

6. The portable terminal according to claim 4, further comprising a unit for sending necessary information from said second CPU to said first CPU after said first CPU is started.

7. A portable terminal including a first CPU for primarily managing and controlling a communication function and a second CPU for primarily managing and controlling an application, said portable terminal comprising:
- a unit for causing said second CPU to start said first CPU in response to an occurrence of a first-priority event of an application in said portable terminal during an operation in an intermittent reception mode;
- a unit for detecting a reception period operation in the intermittent reception mode in response to an occurrence of a second-priority event, said second-priority event being an event of an application in said portable terminal, said second-priority event being lower than the first-priority event in priority;
- a unit for causing said second CPU to start said first CPU in the reception period;
- a unit for detecting a reception period operation in an intermittent reception cycle in response to an occurrence of a third-priority event, said third-priority event being an event of an application in said portable terminal, said third-priority event being lower than the second-priority event in priority; and
- a unit for causing said second CPU to start said first CPU in the next reception period in the intermittent reception cycle.

8. The portable terminal according to claim 7, further comprising a unit for sending necessary information from said second CPU to said first CPU after said first CPU is started.

9. The portable terminal according to claim 7, wherein the necessary information is sent within the reception period.

10. A control method for use in a portable terminal including a first CPU for primarily managing and controlling a communication function and a second CPU for primarily managing and controlling an application, said control method comprising the steps of:
- detecting an occurrence of an application event in said portable terminal;
- detecting an operation of a control target unit that is under control of said first CPU and that operates in an intermittent reception mode; and
- causing said second CPU to start said first CPU in the operation period of said control target unit.

11. The control method for use in a portable terminal according to claim 10, wherein said control target unit is a low-noise amplifier provided in an RF unit of said portable terminal.

12. The control method for use in a portable terminal according to claim 10, further comprising the operation of sending necessary information from said second CPU to said first CPU after said first CPU is started.

13. A control method for use in a portable terminal including a first CPU for primarily managing and controlling a communication function and a second CPU for primarily managing and controlling an application, said control method comprising:
- a first control step comprising the step of causing said second CPU to start said first CPU during an operation in an intermittent reception mode in response to an occurrence of an application event in said portable terminal;
- a second control step comprising the steps of:
- detecting a reception period during an operation in an intermittent reception mode in response to an occurrence of an application event in said portable terminal; and
- causing said second CPU to start said first CPU in the reception period; and
- a third control step comprising the steps of
- detecting a reception period of an intermittent reception cycle during an operation in an intermittent reception mode in response to an occurrence of an application event in said portable terminal;
- waiting until the next reception period in the intermittent reception cycle; and
- causing said second CPU to start said first CPU in the next reception period,
- said control method further comprising the step of:
- making said first control step correspond to a first-priority event, said second control step correspond to a second-priority event that is lower than the first-priority event in priority, and said third control step correspond to a third-priority event that is lower than the second-priority event in priority.

14. The control method for use in a portable terminal according to claim 13, further comprising the operation of sending necessary information from said second CPU to said first CPU after said first CPU is started.

15. The control method for use in a portable terminal according to claim 13, wherein the necessary information is sent within the reception period.

* * * * *